United States Patent [19]

Horii

[11] Patent Number: 5,850,463
[45] Date of Patent: Dec. 15, 1998

[54] FACIAL IMAGE PROCESSING METHOD AND FACIAL IMAGE PROCESSING APPARATUS

[75] Inventor: Kazuya Horii, Suwa, Japan

[73] Assignees: Seiko Epson Corporation, Tokyo; A.I. Soft, Inc., Nagano, both of Japan

[21] Appl. No.: 665,149

[22] Filed: Jun. 13, 1996

[30] Foreign Application Priority Data

Jun. 16, 1995 [JP] Japan .................................. 7-150625
Oct. 30, 1995 [JP] Japan .................................. 7-281693

[51] Int. Cl.$^6$ .............................. G06K 9/00; G06F 15/00
[52] U.S. Cl. ............................................ 382/118; 395/135
[58] Field of Search .................................... 382/115, 117, 382/118, 165, 166, 167, 243, 236, 394, 107; 395/13, 118, 135, 119, 133, 138; 345/433, 435, 441; 359/22; 358/450, 452, 426, 462, 467

[56] References Cited

U.S. PATENT DOCUMENTS

| | | | |
|---|---|---|---|
| 5,057,940 | 10/1991 | Murakami et al. ...................... | 358/426 |
| 5,375,195 | 12/1994 | Johnston ................................. | 395/135 |
| 5,623,587 | 4/1997 | Bulman .................................... | 395/135 |
| 5,668,595 | 9/1997 | Kayatama et al. ....................... | 348/218 |

*Primary Examiner*—Jose L. Couso
*Assistant Examiner*—Duy M. Dang

*Attorney, Agent, or Firm*—Mark P. Watson

[57] ABSTRACT

A method and apparatus are provided for merging plural facial images by continuously varying the shape interpolation ratio while preventing the positions of facial features from shifting, retaining a specific resemblance between the synthesized image and either of the source images in specific facial features, and changing the facial expression using a simple operation. The facial image processing apparatus comprises first shape matching processor 11 for grossly matching a facial image G1 with a background facial image G3 by focusing on the feature areas of facial image G1 and converting the coordinates of particular points in the feature areas in the shape model of this facial image G1 to the coordinates of the corresponding point in the shape model of the background facial image G3; a second shape matching processor 12 for grossly matching a facial image G2 with a background facial image G3 by focusing on the feature areas of facial image G2 and converting the coordinates of particular points in the feature areas in the shape model of this facial image G2 to the coordinates of the corresponding point in the shape model of the background facial image G3; shape interpolation processor 1 for interpolating the coordinates of corresponding points in the matched shape models of facial images G1 and G2 and the shape model of background facial image G3 at a specific interpolation ratio; and color interpolation processor 2 for interpolating the color of each pixel in the shape model interpolated by shape interpolation processor 1 using a specific interpolation ratio.

18 Claims, 10 Drawing Sheets

| FACIAL IMAGE G1 | | | FACIAL IMAGE G2 | | | SELECTED FACIAL IMAGE | | | |
|---|---|---|---|---|---|---|---|---|---|
| hair | skin | eyes | Hair | Skin | Eyes | Group | Hair | Skin | Eyes |
| black | yellow | brown | black | white | blue | Z1 | black | white | blue |
| blonde | white | blue | blonde | white | brown | Z2 | blonde | white | blue |
| ⋮ | ⋮ | ⋮ | ⋮ | ⋮ | ⋮ | ⋮ | ⋮ | ⋮ | ⋮ |
| brown | black | brown | black | yellow | brown | Zn | brown | black | brown |

SHAPE INTERPOLATION RATIO
G1 : G2 = 0.7 : 0.3

SHAPE INTERPOLATION RATIO
G1 : G2 = 0.5 : 0.5

SHAPE INTERPOLATION RATIO
G1 : G2 = 0.3 : 0.7

FACIAL IMAGE PROCESSING METHOD AND FACIAL IMAGE PROCESSING APPARATUS

FIELD OF THE OF THE INVENTION

The present invention relates to a facial image processing method and a facial image processing apparatus for merging, for example, two facial images with a background facial image to generate a new synthesized image.

DESCRIPTION OF THE RELATED ART

Image synthesizers related to the present invention have been used, for example, to generate the facial image of a child using facial images of a man, a woman, and a child by merging the facial features of the man and woman with the facial features of the child.

This type of image synthesis uses two facial images G1 and G2, a facial image G3 that becomes the background, and shape models for each of these facial images G1, G2, and G3. Features found in facial images G1 and G2 are then merged with the background facial image G3 based on the facial images G1, G2, and G3 and the corresponding shape models.

FIG. 12 is a block diagram referenced below to describe the process executed by a conventional image synthesizing apparatus.

Referring to FIG. 12, this image synthesizing apparatus comprises shape interpolation processor 1 and color interpolation processor 2. The image shape data (described below) for each of the images G1, G2, and G3 is input to shape interpolation processor 1; the color data for each of the images G1, G2, and G3, the image shape data for each of the images G1, G2, and G3, and the shape interpolation data from shape interpolation processor 1, are input to color interpolation processor 2. Color interpolation processor 2 then processes and outputs the synthesized image.

The image shape data is typically derived from a wire frame model comprising, as shown in FIG. 13, a number for each point q (e.g., q0, q1,...) in the facial image; the number of the line L (e.g., L1, L2,...) connecting any one point with another point; and the number of each patch p (e.g., p0, p1,...) bounded by the lines connecting any three adjacent points q. The image shape data specifically expresses the coordinates of each point q, the data for each line L (e.g., data indicating that line L0 connects points q0 and q1), and the data for each patch p (e.g., data indicating that patch p0 is defined by points q0, q1, and q2).

Shape interpolation processor 1 then executes the shape interpolation process using the image shape data for images G1 and G2, i.e., interpolates the coordinates for corresponding points in images G1 and G2 using a known ratio (e.g., adding both coordinate values and dividing by two) to interpolate the new shape. After shape interpolation, color interpolation processor 2 interpolates the color data for each patch in the interpolated image by processing the color data for each pixel in image G1 and image G2 corresponding to a particular position in each patch at a known ratio. The interpolated color data is then written to a specific position in each shape-interpolated patch to produce the synthesized image data.

To generate a merged facial image in which a facial image G1 of the father and a facial image G2 of the mother are interpolated into a background image G3 (the facial image of the "child") to produce a single composite image of the three, shape and color interpolation processes are executed using interpolation ratios for images G1, G2, and G3 totalling 1.

With this type of image synthesis processor, the coordinate data of the two shape models for the images to be merged (images G1 and G2) is directly interpolated to obtain the shape model of the synthesized image. As a result, when merging two images by continuously changing the interpolation ratio as shown in FIG. 14, the positions of certain facial feature areas such as the eyes and mouth tend to move in small increments. Note that the G1:G2 shape interpolation ratio is 0.7:0.3 in FIG. 14A, 0.5:0.5 in FIG. 14B, and 0.3:0.7 in FIG. 14C.

It should also be noted that conventional image synthesis processors have no means of changing the shape interpolation ratio or color interpolation ratio for specific facial features, e.g., the eyes, mouth, and nose, and apply interpolation processing using constant shape and color interpolation ratios. This means it is not possible, for example, to produce a synthesized image in which individual facial features resemble the corresponding feature in only one of the source images, e.g., the eyes resemble the eyes in image G1 (the "male" image) and the nose resembles the nose in image G2 (the "female" image). Similarly, the use of a constant color interpolation ratio may result in an unnaturally colored synthesized image because both extremely low and extremely high luminance image areas, such as dark shadows, hair, and highlights, can affect the interpolated colors in unpredictable ways.

This conventional facial image synthesis process also provides no consideration for characteristic coloring indicative of race, including the color of the skin, eyes, and hair in the processed facial images. While this is not a problem when merging images of two subjects from the same racial group, unnatural composite facial images can result with the conventional image synthesis method when merging facial images of people with different color hair, eyes, or skin. For example, if facial images G1 and G2 merged with a background facial image G3 of a child are male and female Caucasian adults with blonde hair and blue eyes, and the facial image G3 of the child is that of a Japanese child, the facial image of the child after image synthesis will be unnatural.

Conventionally, however, the background facial image G3 has not been specifically selected according to the color characteristics indicating the race of the subjects in facial images G1 and G2 (i.e., the color of the hair, eyes, and skin).

Conventional image synthesis processors have also been capable of changing the facial expression of the synthesized image by slightly shifting the coordinate values of a given point in a particular feature area (e.g., the eyes, noise, eyebrows, or mouth) using a single facial image. For example, by moving a point in the area of the lower eyelids slightly up, a smile can be given to the synthesized image. This is generally accomplished by predefining the data (called "expression data") identifying what facial points are to be moved how much in what direction to achieve a certain expression. For example, to create a smile, the expression data may be programmed to move a point in the lower eyelid ten pixels up in the image.

The problem with this technique is that the expression data defines constant values causing an equal amount of movement in the corresponding points irrespective of the size of the facial image. This can cause extremely unnatural expressions when, for example, the facial image is much smaller than the standard image assumed for the constant expression data, causing the selected points to be moved too far.

While displacement vector normalization is one method currently used to compensate for this problem, conventional displacement vector normalization techniques are intended for rectangular curved-surface patches Bejier, and require differentiation and other complex computations.

Another common facial image processing task conventionally executed using a single facial image is aging, i.e., modifying the facial image to generate an image showing the anticipated appearance of the person in the source image after a period of time. This is referred to as the "aging process" below. One technique used in this aging process simulates the sagging of the skin. This process treats the skin as a resilient fabric structure, and achieves the appearance of sagging skin by applying the effects of gravity pulling down on the skin.

However, while this method can be expected to impart a certain aging effect, it has not been possible to achieve a realistic aging effect.

OBJECTS OF THE INVENTION

Therefore, the object of the present invention is to provide a facial image processing method and facial image processing apparatus capable of merging plural facial images by continuously varying the shape interpolation ratio while preventing the positions of facial feature areas from shifting; changing the shape interpolation ratio on a facial feature unit basis to retain a resemblance between the merged image and either of the source images in specific facial feature units; changing the color interpolation ratio according to the luminance of the facial image to achieve a natural color balance in the synthesized image; reflecting in the synthesized facial image the color of the hair, eyes, or skin characteristic of the race of the subject image; changing the facial expression by means of a simple operation; and applying an aging process to achieve an appropriate aging effect in the subject image.

SUMMARY OF THE INVENTION

To achieve the aforementioned object, a facial image processing method according to the present invention is used to synthesize a facial image by combining the features of two facial images G1 and G2 into a third background facial image G3 based on the two facial images G1 and G2, a facial image G3 used as the background, and corresponding shape models matching these facial images G1, G2, and G3. Such facial image processing method grossly matches a facial image G1 to a background image G3 by focusing on the feature areas of facial image G1 and converting the coordinates of particular points in such feature areas in the shape model of facial image G1 to the coordinates of the corresponding points in the shape model of the background image G3; grossly matches a facial image G2 to a background image G3 by focusing on the feature areas of facial image G2 and converting the coordinates of particular points in such feature areas in the shape model of facial image G2 to the coordinates of the corresponding points in the shape model of the background image G3; interpolates the shape of the synthesized image by interpolating the coordinates of corresponding points in the matched shape models of facial images G1 and G2 and the shape model of background image G3 at a specific interpolation ratio; and interpolates the color of each pixel in the interpolated shape model using a specific interpolation ratio.

High quality synthesized images can therefore be obtained without the positions of such facial feature areas as the eyes and mouth moving slightly each time the shape interpolation ratio is changed even when merging two facial images by continuously changing the shape interpolation ratio.

In addition, the process for interpolating the coordinates of specific corresponding points in the matched shape models of facial images G1 and G2 and the shape model of facial image G3 at a specific interpolation ratio interpolates the shapes while changing the shape interpolation ratio according to the facial feature area being generated by the interpolation process.

It is therefore possible to cause the synthesized image to resemble either of the source facial images G1 or G2 in specific individual facial features, such as the eyes or mouth.

Furthermore, the process for interpolating the color of each corresponding pixel in the interpolated shape model at a specific interpolation ratio sets the color interpolation ratio according to the luminance value of the corresponding area in the background facial image G3. As a result, when there is an area in the background image having a characteristic luminance value, the color interpolation ratio for such area can be set to maintain the hue of that area in the synthesized image, and a naturally colored synthesized image can thereby be obtained.

More specifically, the color interpolation ratio for the areas of the background facial image G3 where the luminance value is the median luminance value of the skin color in the facial image G3 is set lowest relative to the color interpolation ratio of facial images G1 and G2; the color interpolation ratio for the areas of the background facial image G3 where the luminance value is above or below a specific range of the median luminance value of the skin color in the facial image G3 is set highest relative to the color interpolation ratio of facial images G1 and G2; and the color interpolation ratio for the areas of the background facial image G3 where the luminance value is within such range of said median luminance value is variably set appropriately to the change in the luminance value. A more naturally colored synthesized image can therefore be obtained because areas in which the luminance value is particularly high or low, such as dark hair or highlights, in the background image are retained in the synthesized image.

The process for interpolating the color of each pixel in the interpolated shape model at a specific interpolation ratio may alternatively set the color interpolation ratio according to the luminance value of the corresponding interpolation area in facial images G1 and G2. As a result, the color interpolation ratio for a feature area in facial images G1 and G2 having a characteristic luminance value can be set according to the luminance value of that feature area. It is thereby possible to eliminate, for example, hair hanging over the forehead in source image G1 or G2 from appearing in the output synthesized image.

In this case, the color interpolation ratio for the areas of facial images G1 and G2 where the luminance value is the median luminance value of the skin color in the facial images G1 and G2 is preferably set highest relative to the color interpolation ratio of facial image G3; the color interpolation ratio for the areas of facial images G1 and G2 where the luminance value is above or below a specific range of the median luminance values of the skin color in the facial images G1 and G2 is set lowest relative to the color interpolation ratio of facial image G3; and the color interpolation ratio for the areas of facial images G1 and G2 where the luminance value is within the range above or below the median luminance value is variably set appropriately to the change in the luminance value. As a result, the color interpolation ratio can be set low for areas in which the luminance value is extremely high, such as dark hair in source image G1 or G2, to eliminate, for example, hair hanging over the forehead in source image G1 or G2 from appearing in the output synthesized image.

In addition, the color interpolation process for interpolating the color of each pixel in the interpolated shape model at a specific interpolation ratio may vary the color interpolation ratio according to the facial feature area being interpolated. It is thereby possible to generate a synthesized image in which the hue of individual facial features, such as the eyes or mouth, resembles the hue of the same facial feature in either of the source facial images G1 or G2. By combining this technique with the technique of changing the shape interpolation ratio according to the facial feature unit, e.g., mouth or eyes, as described above, a synthesized image that more closely and precisely resembles source image G1 or G2 can be obtained.

A facial image processing method according to a further embodiment of the invention for synthesizing a facial image combining the features of two facial images G1 and G2 into a base background facial image G3 based on the three facial images, and corresponding shape models matching these facial images, selects background facial image G3 based on the color data of specific feature areas targeted in facial images G1 and G2. A natural synthesized image can therefore be generated by thus selecting background facial image G3 according to the racial characteristics of facial images G1 and G2.

This facial image processing method may be further characterized by the selection of background facial image G3 based on the color data of specific feature areas in facial images G1 and G2 and being indirectly based on the genetic (racial) characteristics of those selected feature areas, as determined by the color data detected. A more natural synthesized image can therefore be generated by thus selecting background facial image G3 according to the racial characteristics of facial images G1 and G2.

The feature areas of facial images G1 and G2 from which the racial characteristics (color data) are determined preferably include at least one of the following feature areas: the hair, the skin, and the eyes. A more natural synthesized image can therefore be generated by thus selecting background facial image G3 with specific consideration given to characteristic feature areas in the facial images.

A facial image processing method changes the expression of a synthesized image by moving a particular point in the processed facial image a particular distance using a single processed facial image and a shape model matched to the processed facial image. The processed facial image may be, for example, facial image G1, facial image G2, or a synthesized facial image merging features of facial images G1 and G2 with a base background facial image G3. The method calculates the two vectors directed horizontally and vertically toward the contour of the facial image from a particular point in the processed facial image, and the vector that intersects these two vectors. The method has a magnitude that is the geometric mean of these two vectors, and calculates the displacement vector expressing the direction and amount of movement of a particular point in the processed facial image based on the previously obtained vectors and a predefined constant for changing the expression. It is thereby possible to change the facial expression of the synthesized facial image by means of a simple operation.

A facial image processing method applies an aging process to the processed facial image using a single processed facial image and a shape model matched to the processed facial image. The processed facial image may be, for example, facial image G1, facial image G2, or a synthesized facial image merging features of facial images G1 and G2 with a base background facial image G3. The method extracts the image of the skin area from another facial image G5 and a shape model matching the facial image G5 where the facial image G5 is a predefined facial image representing a particular chronological age, and achieves the aging process by mapping the image of the extracted skin area to the skin area of the processed facial image. It is thereby possible to achieve a more realistic aging process.

A facial image processing apparatus according to the present invention for synthesizing a facial image combining the features of two facial images G1 and G2 into a base facial image G3, based on the three facial images, and corresponding shape models matching these facial images G1, G2, and G3, comprises: a first shape matching processor for grossly matching a facial image G1 to a background image G3 by focusing on the feature areas of facial image G1 and converting the coordinates of particular points in said feature areas in the shape model of this facial image G1 to the coordinates of the corresponding points in the shape model of the background image G3; a second shape matching processor for grossly matching a facial image G2 with a facial image G3 by focusing on the feature areas of facial image G2 and converting the coordinates of particular points in the feature areas in the shape model of facial image G2 to the coordinates of the corresponding points in the shape model of the background facial image G3; a shape interpolation processor for interpolating the coordinates of corresponding points in the matched shape models of facial images G1 and G2 and the shape model of background facial image G3 at a specific interpolation ratio; and a color interpolation processor for interpolating the color of each pixel in the shape model interpolated by the shape interpolation processor using a specific interpolation ratio. As a result, a high quality synthesized image can be obtained even when continuously varying the shape interpolation ratio while merging two images without causing the positions of such facial feature units as the eyes and mouth to move slightly each time the shape interpolation ratio is changed.

In addition, the shape interpolation processor for interpolating the coordinates of specific corresponding points in the matched shape models of facial images G1 and G2 and the shape model of facial image G3 at a specific interpolation ratio changes the shape interpolation ratio according to the facial feature area being interpolated. It is thereby possible to cause individual facial features, such as the eyes or mouth, in the synthesized image to resemble either of the source facial images G1 or G2.

Furthermore, the color interpolation processor for interpolating the color of each pixel in the interpolated shape model at a specific interpolation ratio determines the luminance value of each part of the background facial image G3, and sets the color interpolation ratio according to such luminance values. As a result, when there is an area in the background image having a characteristic luminance value, the color interpolation ratio for such area can be set to maintain the hue of that area in the synthesized image, and a naturally colored synthesized image can thereby be obtained.

More specifically, the color interpolation ratio for the areas of the background facial image G3 where the luminance value is the median luminance value of the skin color in the facial image G3 is set lowest relative to the color interpolation ratio of facial images G1 and G2; the color interpolation ratio for the areas of the background facial image G3 where the luminance value is above or below a specific range above or below the median luminance value of the skin color in the facial image G3 is set highest relative to the color interpolation ratio of facial images G1 and G2; and the color interpolation ratio for the areas of the background facial image G3 where the luminance value is within the range of said median luminance value is variably set appropriately to the change in the luminance value. A more naturally colored synthesized image can therefore be obtained because areas in which the luminance value is particularly high or low, such as dark hair or highlights, in the background image are retained in the synthesized image.

Alternatively, the color interpolation processor for interpolating the color of each pixel in the interpolated shape model at a specific interpolation ratio determines the luminance value of each part of the facial images G1 and G2, and sets the color interpolation ratio according to the luminance values. As a result, the color interpolation ratio for a feature area in source image G1 or G2 having a characteristic luminance value can be set according to the luminance value of that feature area. It is thereby possible to eliminate, for example, hair hanging over the forehead in source image G1 or G2 from appearing in the output synthesized image.

More specifically, the color interpolation ratio for the areas of facial images G1 and G2 where the luminance value is the median luminance value of the skin color in said facial images G1 and G2 is set highest relative to the color interpolation ratio of facial image G3; the color interpolation ratio for the areas of facial images G1 and G2 where the luminance value is above or below a specific range above or below the median luminance values of the skin color in said facial images G1 and G2 is set lowest relative to the color interpolation ratio of facial image G3; and the color interpolation ratio for the areas of the facial images G1 and G2 where the luminance value is within the range of said median luminance value is variably set appropriately to the change in the luminance value. As a result, the color interpolation ratio can be set low for areas in which the luminance value is extremely high, such as hair in source image G1 or G2, to eliminate, for example, hair hanging over the forehead in source image G1 or G2 from appearing in the output synthesized image.

In addition, the color interpolation processor for interpolating the color of each pixel in the interpolated shape model at a specific interpolation ratio may vary the color interpolation ratio according to the facial feature area being interpolated. It is thereby possible to generate a synthesized image in which the hue of individual facial features, such as the eyes or mouth, resembles the hue of the same facial feature in either of the source facial images G1 or G2. By combining this technique with the technique of changing the shape interpolation ratio according to the facial feature unit, e.g., mouth or eyes, as described above, a synthesized image that more closely and precisely resembles source image G1 or G2 can be obtained.

A facial image processing apparatus according to a further embodiment of the invention for synthesizing a facial image combining the features of two facial images G1 and G2 into a base background facial image G3 based on the three facial images, and corresponding shape models matching these facial images G1, G2, and G3, further comprises color detection means for detecting the color of feature areas in facial images G1 and G2, and selects background facial image G3 based on the color data of the feature areas detected by the color detection means. A natural synthesized image can therefore be generated by thus selecting the background facial image G3 appropriate to facial images G1 and G2.

This facial image processing apparatus may be further characterized by the selection of background facial image G3 based on the color data of specific feature areas in facial images G1 and G2 and being indirectly based on the genetic (racial) characteristics of these selected feature areas, as determined by the color data detected. In this case a genetic information table storing genetic information is provided and is referenced based on the image data of the feature areas in facial images G1 and G2 to select the background facial image G3 corresponding to the image data of facial images G1 and G2. A more natural synthesized image can therefore be generated by thus selecting background facial image G3 according to the racial characteristics of facial images G1 and G2.

The feature areas of facial images G1 and G2 from which the racial characteristics (color data) are determined preferably include at least one of the following feature areas: the hair, the skin, and the eyes. A more natural synthesized image can therefore be generated by thus selecting background facial image G3 with specific consideration given to characteristic feature areas in the facial images.

A facial image processing apparatus according to the present invention changes the expression of a synthesized image by moving a particular point in the processed facial image a particular distance using a single processed facial image and a shape model matched to the processed facial image. The processed facial image may be, for example, facial image G1, facial image G2, or a synthesized facial image merging features of facial images G1 and G2 with a base background facial image G3. The processing apparatus, comprises expression data storage means for storing predefined constants for changing the expression, and an expression-changing processor for changing the facial expression by obtaining the two vectors directed horizontally and vertically toward the contour of the facial image from a particular point in the processed facial image, and the vector that intersects these two vectors and has a magnitude that is the geometric mean of these two vectors, and calculating the displacement vector expressing the direction and amount of movement of a particular point in the processed facial image based on the previously obtained vectors and a predefined constant for changing the expression. It is thereby possible to change the facial expression of the synthesized facial image by means of a simple operation.

A facial image processing apparatus for applies an aging process to the processed facial image using a single processed facial image and a shape model matched to the processed facial image. The processed facial image may be, for example, facial image G1, facial image G2, or a synthesized facial image merging features of facial images G1 and G2 with a base background facial image G3. The apparatus comprises an image aging processor for accomplishing the aging process by extracting the image of the skin area from another facial image G5 and a shape model matching the facial image G5 where said facial image G5 is a predefined facial image representing a particular chronological age, and mapping the image of the extracted skin area to the skin area of said processed facial image. It is thereby possible to achieve a more realistic aging process.

DESCRIPTION OF THE PREFERRED EMBODIMENTS

The preferred embodiments of the present invention are described below.

Embodiment 1

Figure 1:
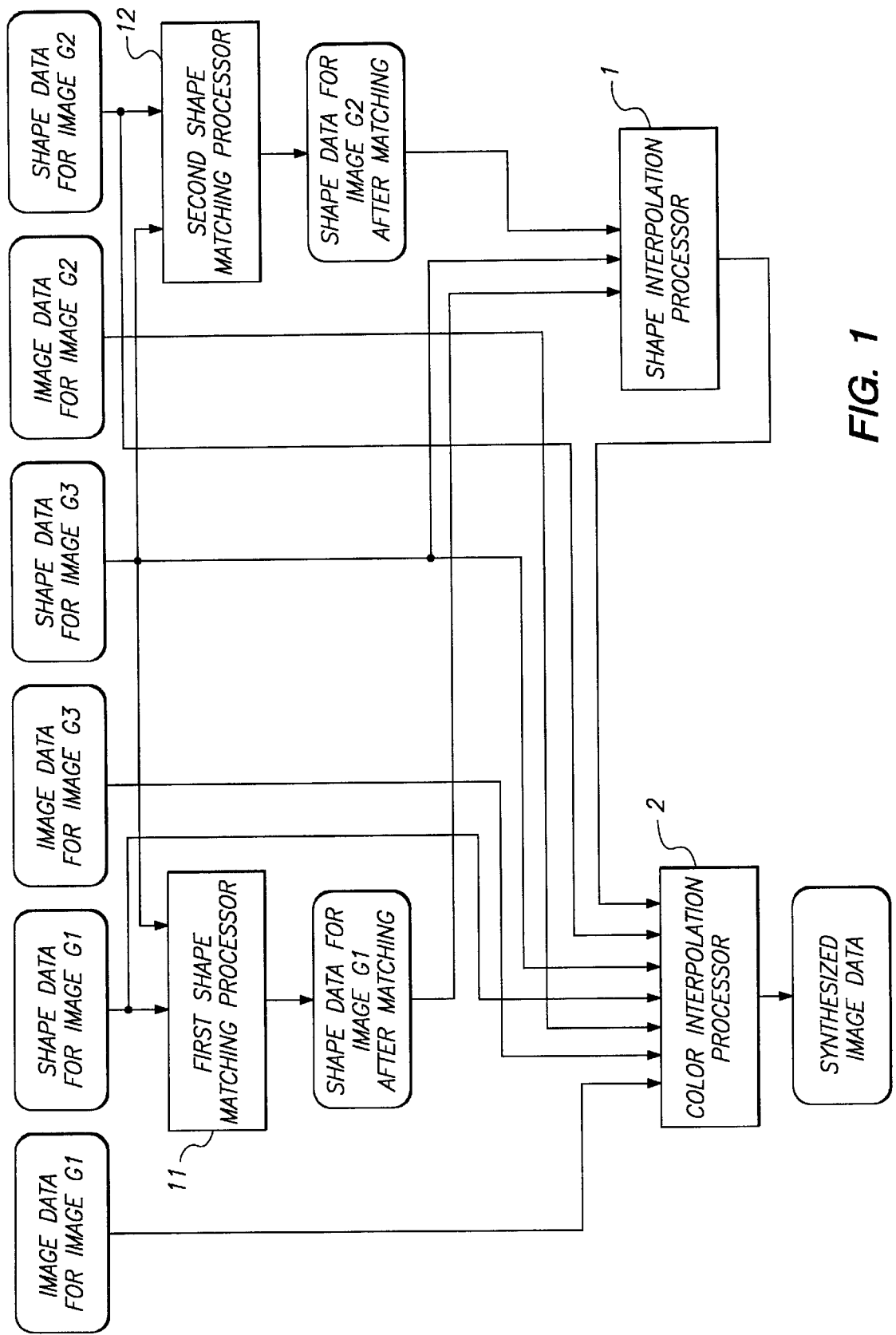
FIG. 1 is a block diagram illustrating the first embodiment of a facial image processing method and facial image processing apparatus according to the present invention.

FIG. 1 is a block diagram used to describe the process executed by the present invention. Note that like parts in FIG. 1 and FIG. 12 are identified by like reference numbers.

Figure 12:
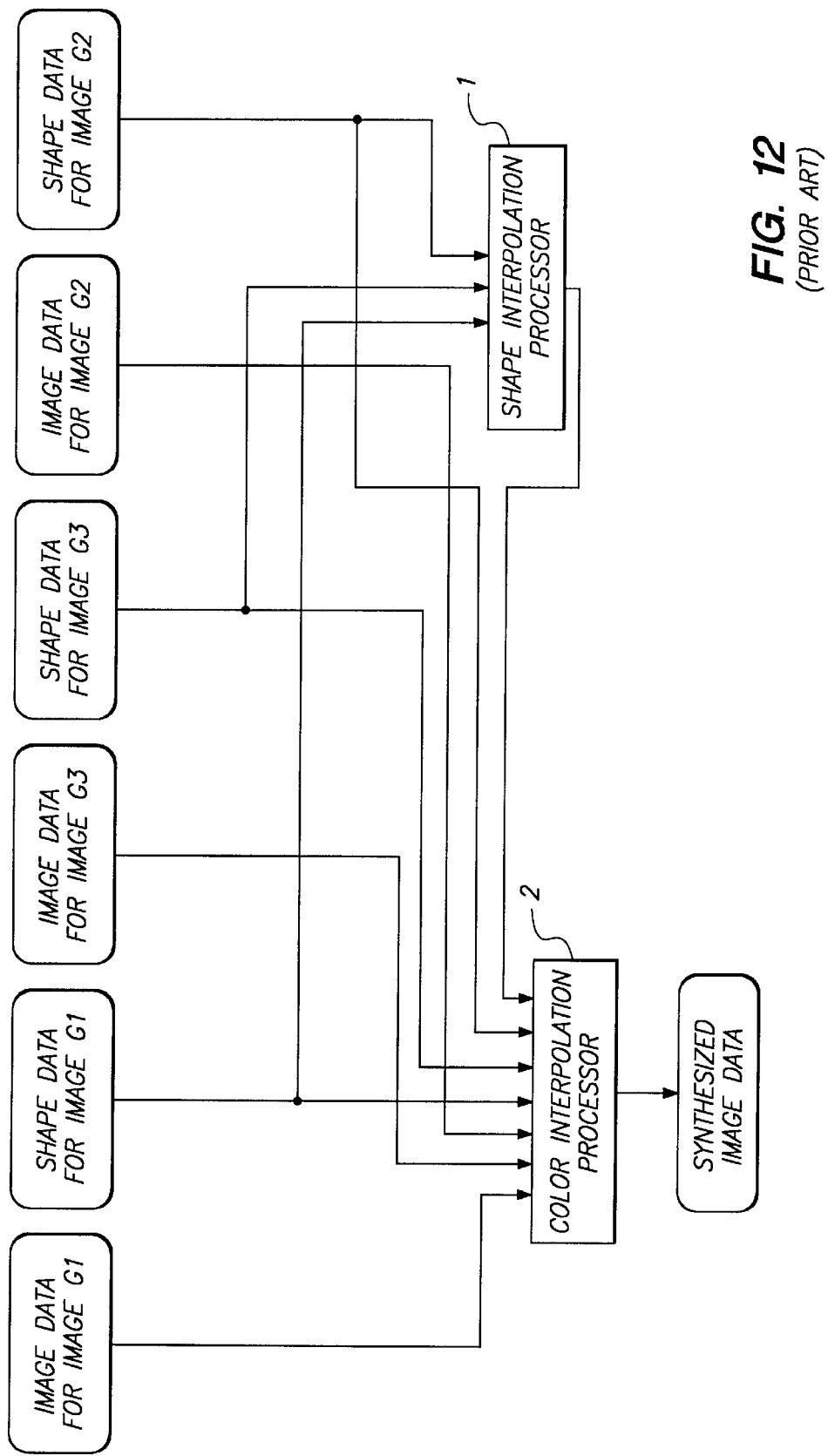
FIG. 12 is a block diagram illustrating the image merging process of the prior art.
Figure 14A:
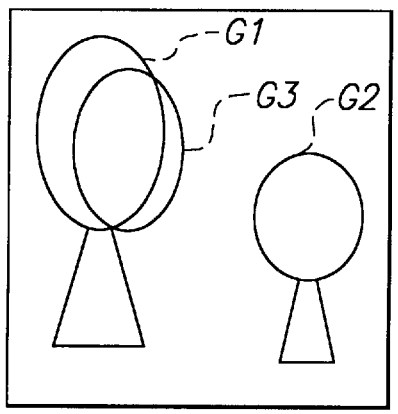
FIG. 14 illustrates the shape interpolation process of the prior art when the shape interpolation ratio is varied continuously.
Figure 14B:
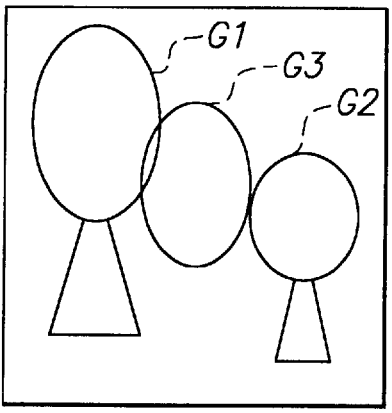
Figure 14C:
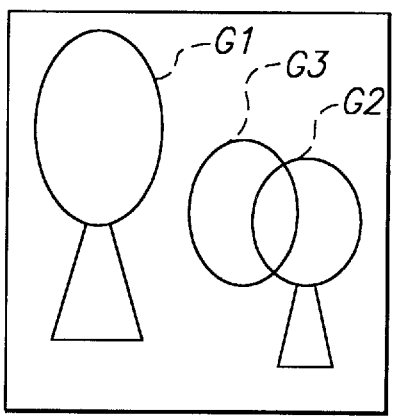

The facial image processing apparatus shown in FIG. 1 differs from that in FIG. 12 in the addition of first and second shape matching processors 11 and 12 for grossly matching the shape data of facial images G1 and G2 to background facial image G3, and outputting the matched shape data to shape interpolation processor 1. The process executed by first and second shape matching processors 11 and 12 is described below.

As shown in FIG. 1, the matched shape data output from first and second shape matching processors 11 and 12, and the shape data of background facial image G3, are input to shape interpolation processor 1. The image and shape data of facial image G1, the image and shape data of facial image G2, the image and shape data of facial image G3, and the interpolated shape data from shape interpolation processor 1, are input to color interpolation processor 2.

The operation of the facial image processing apparatus thus comprised is described below.

Figure 2:
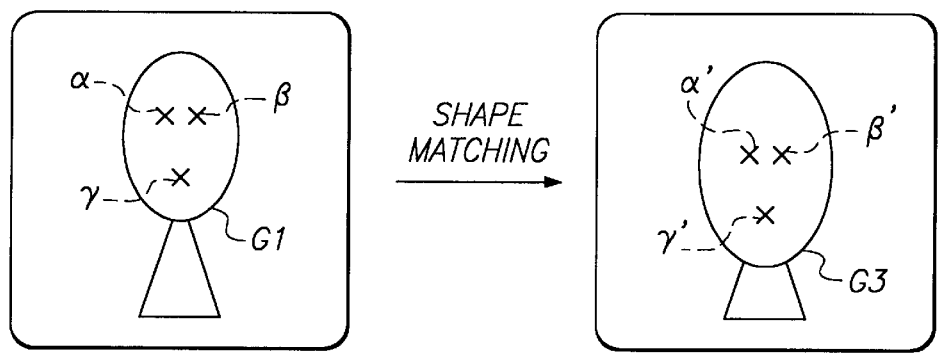
FIG. 2 illustrates the gross shape matching process of the first embodiment of the invention.

Using the respective shape data for facial images G1 and G2, first and second shape matching processors 11 and 12 execute a process grossly matching the shape models for facial images G1 and G2 to facial image G3 (see FIG. 2). By way of example, the process grossly matching facial image G1 to facial image G3 is described below with reference to FIG. 2.

Both eyes and the mouth having center points $\alpha$, $\beta$, and $\gamma$, respectively, are first selected as the facial features to be processed in facial image G1. The coordinates of center points $\alpha$, $\beta$, and $\gamma$ are then converted to the center points $\alpha'$, $\beta'$, and $\gamma'$ of the eyes and mouth in facial image G3 by applying an affine transformation using the following equation (1).

$$\begin{bmatrix} X\alpha' \\ Y\alpha' \end{bmatrix} = \begin{bmatrix} C0 & C1 \\ C2 & C3 \end{bmatrix} \begin{bmatrix} X\alpha \\ Y\alpha \end{bmatrix} + \begin{bmatrix} C4 \\ C5 \end{bmatrix}$$

$$\begin{bmatrix} X\beta' \\ Y\beta' \end{bmatrix} = \begin{bmatrix} C0 & C1 \\ C2 & C3 \end{bmatrix} \begin{bmatrix} X\beta \\ Y\beta \end{bmatrix} + \begin{bmatrix} C4 \\ C5 \end{bmatrix} \quad \text{Equation 1}$$

$$\begin{bmatrix} X\gamma' \\ Y\gamma' \end{bmatrix} = \begin{bmatrix} C0 & C1 \\ C2 & C3 \end{bmatrix} \begin{bmatrix} X\gamma \\ Y\gamma \end{bmatrix} + \begin{bmatrix} C4 \\ C5 \end{bmatrix}$$

The equations shown in (1) are simultaneously calculated to obtain affine coefficients c0~c5. Note that affine coefficients c0 to c3 express rotation, enlargement, and reduction, respectively, and c4 and c5 express parallel movement. Note also that in equation (1) (X$\alpha$,Y$\alpha$) are the coordinates of point $\alpha$, (X$\beta$,Y$\beta$) are the coordinates of point $\beta$, (X$\gamma$,Y$\gamma$) are the coordinates of point $\gamma$, (X$\alpha'$,Y$\alpha'$) are the coordinates of point $\alpha'$, (X$\beta'$,Y$\beta'$) are the coordinates of point $\beta'$, and (X$\gamma'$,Y$\gamma'$) are the coordinates of point y'. It should also be noted that the coordinates for each point are in practice the coordinates of each point in a three-dimensional space of axes X, Y, and Z.

It is possible, by applying the affine coefficients c0~c5 obtained from equation (1), to convert the coordinates of all points other than center points $\alpha$,$\beta$, and $\gamma$ to facial image G3. More specifically, the coordinate values of each point after conversion can be obtained by substituting the coordinate values for each point in facial image G1 in equation (1) above.

The result of this affine transformation of the coordinate positions of the eyes and mouth in facial image G1 to the coordinate positions of the eyes and mouth in facial image G3 is a rough matching of the eyes and mouth in facial image G1 to facial image G3, as well as a rough matching of all other points (i.e., the overall facial image) in facial image G1 to facial image G3. This gross matching process is executed by first shape matching processor 11, which then outputs the grossly matched shape data to shape interpolation processor 1.

The second source facial image G2 is similarly matched to facial image G3, and the grossly matched shape data obtained by second shape matching processor 12 is likewise output to shape interpolation processor 1.

Using the matched shape data from facial image G1, the matched shape data from facial image G2, and the shape data of facial image G3, shape interpolation processor 1 performs the shape interpolation process using interpolation ratios that total one.

Figure 3A:
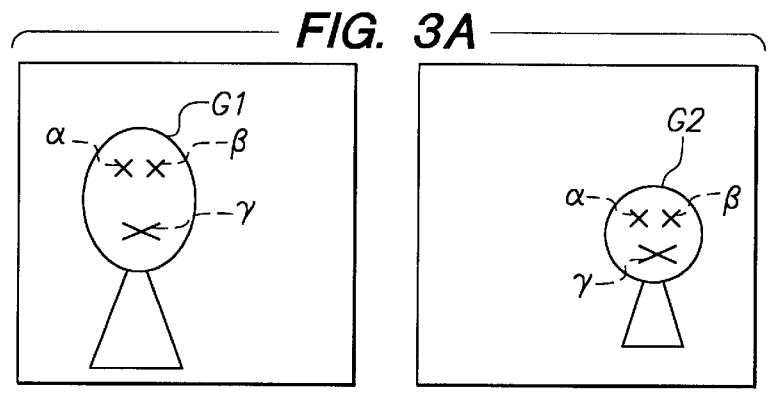
FIG. 3 illustrates the shape interpolation process of the first embodiment of the invention.
Figure 3B:
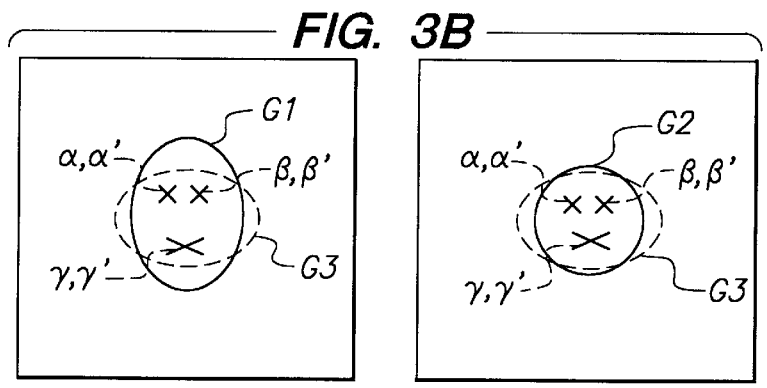

The operation to this point is shown in FIGS. 3A, B, and C. FIG. 3A shows the source facial images G1 and G2, which are grossly matched to facial image G3, which is shown by the dotted lines in FIGS. 3B. As described above, this gross matching process is accomplished by an affine transformation using equation (1) to convert the center coordinates (X$\alpha$,Y$\alpha$) and (X$\beta$,Y$\beta$) of the eyes and (X$\gamma$,Y$\gamma$) of the mouth in facial image G1 (G2) to the corresponding center points $\alpha'$, $\gamma'$, and $\gamma'$ of the eyes and mouth in facial image G3. After obtaining coefficients c0~c5 from equation (1), these coefficients c0 ~c5 are used to perform an affine transformation of all other points in facial image G1 (G2) to the corresponding points in facial image G3. FIGS. 3B show facial images G1 and G2 grossly matched to facial image G3, the dotted lines showing facial image G3 and the solid lines showing facial images G1 and G2.

Figure 3C:
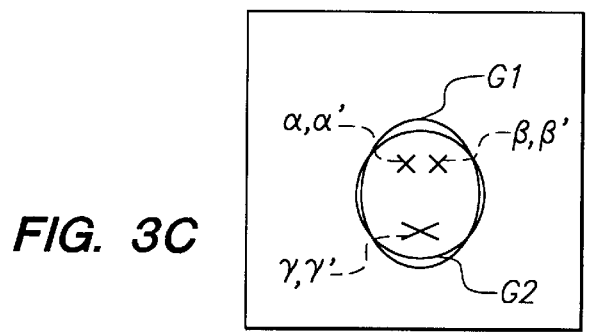

Shape interpolation by shape interpolation processor 1 is then accomplished using this grossly matched shape data (coordinate data) and the shape data (coordinate data) of facial image G3, thus enabling shape interpolation processing with the eyes and mouths of facial images G1 and G2 occupying the same points (coordinates) as shown in FIG. 3C. This means that the positions of the eyes and mouth will not move even a nominal distance even when the interpolation ratio is changed continuously.

Color interpolation by color interpolation processor 2 is executed after shape interpolation is completed. This color interpolation process interpolates image colors using the shape data for facial images G1, G2, and G3, the shape interpolation data output from shape interpolation processor 1, and the image data (i.e., color data) for facial images G1, G2, and G3, by applying a particular interpolation ratio while mapping the colors to output the synthesized image data.

Shape interpolation processor 1 is also able to change the shape interpolation ratio for the coordinates of points in the areas of specific facial features, such as the eyes, mouth, nose, and eyebrows, according to the position of that facial feature. This makes it possible to create a synthesized image specifically resembling facial image G1 or specifically resembling facial image G2. For example, if the shape interpolation ratio for the coordinates of points in the area of the nose is set higher for facial image G1 than for facial image G2, a synthesized image in which the nose resembles facial image G1 (e.g., the father) can be obtained.

Color interpolation processor 2 is also able to change the color interpolation ratio according to the luminance value of facial image G3.

Changing the color interpolation ratio is a means of resolving such problems as unnatural coloring or fading in the synthesized image of the hair area in image G3 as a result of low luminance image areas, such as dark hair, or high luminance image areas, such as highlights, in the background facial image G3 partially affecting the synthesized image. This is because it is preferable to leave the characteristic hues of the background facial image G3 (e.g., the color of the hair, image highlights) unchanged, and synthesize facial images G1 and G2 based on facial image G3.

To achieve this, the luminance value of the image area to be used for the reference luminance value is first selected in facial image G3 (from the range of all luminance values in facial image G3). Image areas in which the luminance value is greater than or less than this reference luminance value by a known amount (i.e., above or below a known range above and below this reference luminance value) are assumed to be areas in facial image G3 having a characteristic hue that should be expressed in the synthesized image. The color interpolation ratio of facial image G3 is therefore set higher (e.g., the color interpolation ratio of image G3 is set to the highest possible color interpolation ratio) than the color interpolation ratio of facial images G1 and G2 in these areas to maximize use of the luminance values in facial image G3 while processing these image areas. This is described below referring to FIG. 4.

Figure 4:
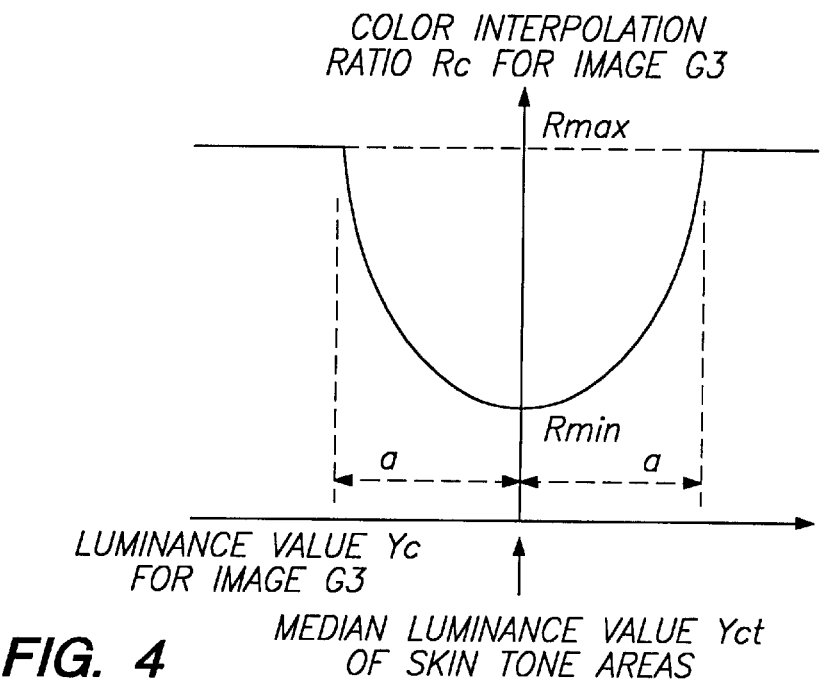
FIG. 4 is a graph illustrating the process of setting the color interpolation ratio according to the luminance value of the background image in the first embodiment of the invention.

In FIG. 4, the luminance value Yc of facial image G3 is shown on the horizontal axis, and the color interpolation ratio of facial image G3 is shown on the vertical axis. In this example, the median luminance of the facial skin color is selected as the reference luminance value Yct of facial image G3, and a range of luminance values defined as this reference luminance Yct plus or minus luminance a is selected. Then, when the luminance value Yc in facial image G3 is within this range, i.e., when $(Yct-a) \leq Yc \leq (Yct+a)$, color interpolation ratio Rc of facial image G3 is obtained by the curve (the curve shown by the fine line in FIG. 4) and is defined by $$Rc = R\text{min} + (R\text{max} - R\text{min}) \left[ 1.0 - \cos\left\{ \frac{(Yc - Yct)}{a} \times \frac{\pi}{2} \right\} \right]. \qquad \text{Equation 2}$$

Note that color interpolation ratio Rc of facial image G3 is a value between the lowest possible color interpolation ratio Rmin and the highest possible color interpolation ratio Rmax in facial image G3.

When the luminance value Yc in facial image G3 is not within this range, i.e., when $(Yct-a) > Yc$ or $Yc > (Yct+a)$, the color interpolation ratio for facial image G3 is obtained from the line $$Rc = R\text{max} \qquad \text{Equation 3}$$

(the thin straight horizontal line shown in FIG. 4). Note that in this case the value of color interpolation ratio Rc for these areas in facial image G3 is set to the highest possible color interpolation ratio Rmax in facial image G3.

In other words, when the luminance value of an area in facial image G3 is extremely low, such as in shadows or dark hair, or extremely high, such as in highlighted areas, the color interpolation ratio for facial image G3 is set to the highest possible color interpolation ratio to leave these feature areas in facial image G3 unchanged, and thereby obtain a more natural synthesized image. At the same time, however, skin tones in facial images G1 and G2 are preferably reflected in the color interpolated for the synthesized image. To accomplish this, the color interpolation ratio of image G3 is changed according to the luminance value of such skin tone areas. When the luminance value of a skin tone area is the median (reference) luminance value, the color interpolation ratio of facial image G3 is set to the lowest value (Rmin). When the luminance value is within the range $\pm a$ of the median luminance value, the color interpolation ratio is obtained from the corresponding point on the curve shown in FIG. 4.

While this method of determining the color interpolation ratio achieves good results when applied only to feature areas in facial image G3 that are desirably retained in the synthesized image, such as the hair and shadows, application of this process to, for example, the eyes and eyebrows in facial image G3 will cause the color of the eyes and eyebrows in facial image G3 (the child image) to also be interpolated at a high ratio, resulting in the characteristics of facial images G1 and G2 being virtually absent in the synthesized image. The eyes and eyebrows of facial image G3 are therefore not interpolated by the process shown in FIG. 4, but are processed using an optimized interpolation ratio.

It is to be noted that while the present embodiment has been described as determining the color interpolation ratio based on the curve shown in FIG. 4 for the range of luminance values $\pm a$ of the reference luminance value, the invention shall not be so limited. Rather than varying the color interpolation ratio according to a curve as shown in FIG. 4, the luminance value range boundaries may be a series of steps or a linear curve from which the color interpolation ratio is obtained.

Color interpolation processor 2 may also be designed to vary the color interpolation ratio according to the luminance values in the source facial images G1 and G2. This may be used to prevent, for example, hair covering the forehead of the subject in facial images G1 or G2 from remaining as a thin overcast to the forehead in the synthesized image, as may occur when facial images G1, G2, and G3 are color interpolated at a constant ratio. If (dark) areas of extremely low luminance in facial image G1, or (dark) areas of extremely low luminance in facial image G2, are reflected as areas of extreme darkness (e.g., areas of dark hair) in the synthesized image based on the luminance value of facial images G1 or G2, an unnatural synthesized image may result. To prevent this, color interpolation is executed using a low color interpolation ratio for facial images G1 or G2, and a high color interpolation ratio for the background facial image G3.

To achieve this, the luminance value of the image area to be used for the reference luminance value is first selected in facial images G1 and G2 (from the complete range of luminance values in facial images G1 and G2). Areas in facial images G1 and G2 in which the luminance value is above or below this reference luminance value by a known amount (i.e., above or below a range of luminance values above and below this reference luminance value) are assumed to be areas (such as hair) in facial images G1 and G2 that are not to be expressed (retained) in the synthesized image. The color interpolation ratio for these parts of facial images G1 and G2 is therefore set to the lowest possible value, and the color interpolation ratio for facial image G3 is set to the highest possible value. This is described below referring to FIG. 5.

Figure 5:
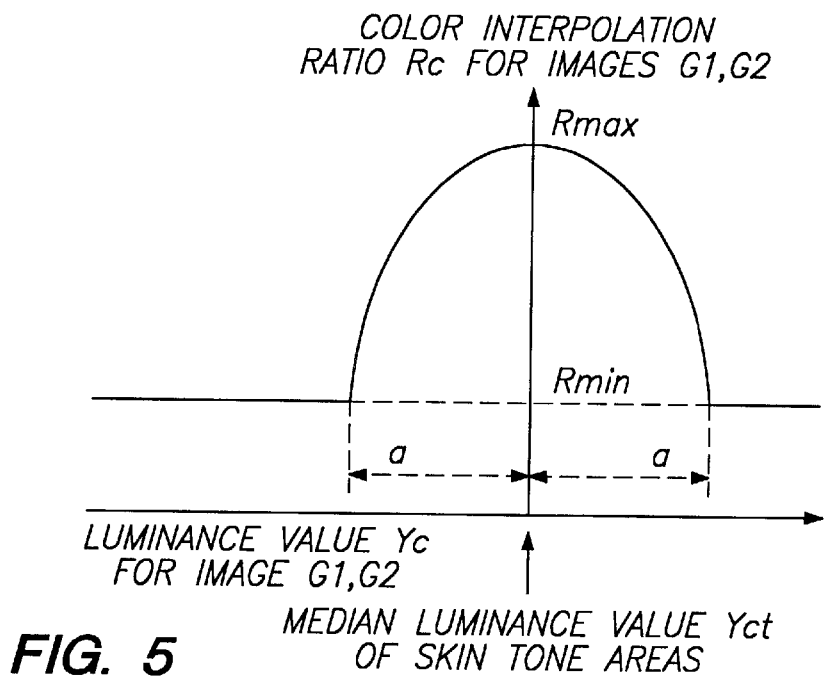
FIG. 5 is a graph illustrating the process of setting the color interpolation ratio according to the luminance values of the two images being merged in the first embodiment of the invention.

In FIG. 5, the luminance values Yc of facial images G1 and G2 are shown on the horizontal axis, and the color interpolation ratios of facial images G1 and G2 are shown on the vertical axis. In this example, the median luminance of the facial skin color is selected as the reference luminance value Yct of facial images G1 and G2, and a range of luminance values defined as this reference luminance Yct plus or minus luminance α is selected. Then, when the luminance value Yc in facial image G1 or G2 is within this range, i.e., when $(Yct-a) {}^2Yc {}^2(Yct+a)$, color interpolation ratio Rc of image G1 or G2 is obtained by the curve (the curve shown by the fine line in FIG. 5) and is defined by $$Rc = R\min + (R\max - R\min)\left[\cos\left\{\frac{(Yc - Yct)}{a} \times \frac{\pi}{2}\right\}\right]. \quad \text{Equation 4}$$

Note that color interpolation ratio Rc of facial image G1 or G2 is a value between the lowest possible color interpolation ratio Rmin and the highest possible color interpolation ratio Rmax in image G1 or G2.

When the luminance value Yc in facial image G1 or G2 is not within this range, i.e., when (Yct−a)>Ye or Yc>(Yct+a), the color interpolation ratio for facial image G1 or G2 is obtained from the line $$Rc = R\min \quad \text{Equation 5}$$

(the thin straight horizontal line shown in FIG. 5). Note that in this case the value of color interpolation ratio Rc for these areas in facial image G1 or G2 is set to the lowest possible color interpolation ratio Rmin in facial image G1 or G2.

In other words, when the luminance value of an area in facial image G1 or G2 is extremely low, such as in shadows or dark hair, and that image area is therefore not desirable in the synthesized image, the color interpolation ratio for facial image G1 or G2 is set to the lowest possible color interpolation ratio. In skin color areas, however, the color found in image G1 or G2 is preferably interpolated into the hue generated for the synthesized image. In this case, the color interpolation ratio for image G1 or G2 is optimally varied according to the luminance value of the area in which the skin color is found.

When the luminance value of a skin colored area is the median (reference) luminance value, the color interpolation ratio for facial image G1 or G2 is set to the highest possible ratio (Rmax). When the luminance value is within the range ±α of the median luminance value (the reference luminance value), the color interpolation ratio is obtained from the corresponding point on the curve shown in FIG. 5.

While this method of determining the color interpolation ratio achieves good results when applied only to feature areas, such as hair, in facial image G1 or G2 that are not desirably retained in the synthesized image, application of this process to, for example, the eyes and eyebrows in facial image G1 or G2 will cause the color of the eyes and eyebrows in facial image G1 or G2 to be interpolated at a low ratio, resulting in the eyes and eyebrows in facial image G1 or G2 being virtually absent in the synthesized image. The eyes and eyebrows of facial images G1 and G2 are therefore not interpolated by the process shown in FIG. 5, but are processed using an optimized interpolation ratio.

It is to be noted that while the present embodiment has been described as determining the color interpolation ratio based on the curve shown in FIG. 5 for the range of luminance values±α of the reference luminance value, the invention shall not be so limited. Rather than varying the color interpolation ratio according to a curve as shown in FIG. 5, the luminance value range boundaries may be a series of steps or a line from which the color interpolation ratio is obtained.

Color interpolation processor 2 can also control interpolation of the hue in any given feature area to resemble the corresponding feature area in facial image G1 (father image) or facial image G2 (mother image) by changing the color interpolation ratio for all pixels within the patch(es) corresponding to that feature area, e.g., the eyes, mouth, nose, or eyebrows. For example, to make the hue of the nose in the synthesized image resemble that of the father (facial image G1), the patch(es) covering the nose are processed by, for example, increasing the color interpolation ratio applied to those patches of the father image G1. This technique can be applied to any facial feature area in facial images G1 and G2 so that the hue in the corresponding feature area in the interpolated image resembles either image G1 or G2.

In practice, this process is linked to the process whereby shape interpolation processor 1 changes the shape interpolation ratio according to the feature area. It is thus possible to appropriately set the shape interpolation ratio and the color interpolation ratio, and to thereby generate a synthesized image in which the shape and hue of a given feature area resemble the shape and hue of that area in either image G1 or G2, i.e., to create a synthesized image resembling either the father or the mother on a facial feature unit basis.

It is also possible in this first embodiment to apply an aging process to facial images G1 and G2 using either facial image G1 or facial image G2 and background facial image G3. For example, if facial image G1 is that of a relatively young adult male, background facial image G3 is that of an elderly adult male, and facial image G1 is merged to this background facial image G3, the resulting synthesized image will appear to be facial image G1 after aging a number of years. If background facial image G3 is an image of a young child, this same operation will generate a synthesized image in which facial image G1 has been rejuvenated.

Embodiment 2

The second embodiment described below provides a method and apparatus for synthesizing facial images G1 and G2 with a background facial image G3 of a child where facial images G1 and G2 have the facial coloring characteristic of different racial groups. Note that the coloring characteristic of different racial groups as used herein refers specifically to the hair color, eye color, and skin color. This second embodiment is described below with reference to FIG. 6.

Figures 6, 7:
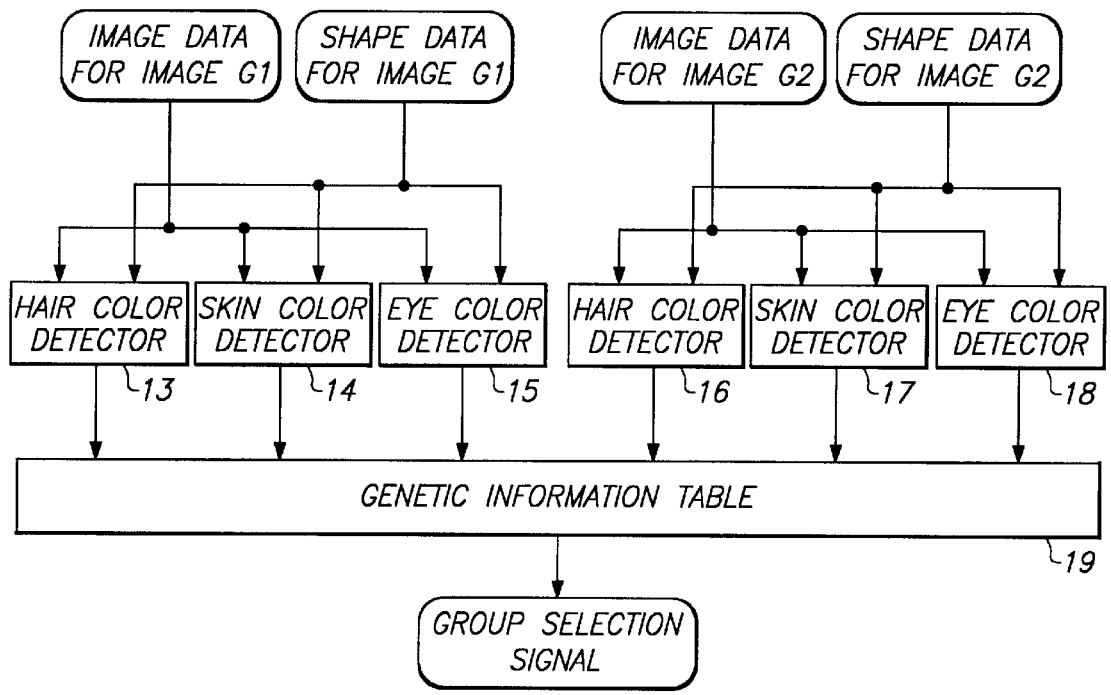
FIG. 6 is a block diagram illustrating the second embodiment of a facial image processing method and facial image processing apparatus according to the present invention.
FIG. 7 shows an example of the genetic information table used in the second embodiment of the present invention.

FIG. 6 is a block diagram of a facial image processing apparatus according to this second embodiment. As shown in FIG. 6, this facial image processing apparatus comprises hair color detector 13 for detecting the hair color, skin color detector 14 for detecting the skin color, and eye color detector 15 for detecting the eye color based on the shape data and image data (color data) of one source image, i.e., the male facial image G1 in this example. The facial image processing apparatus further comprises hair color detector 16 for detecting the hair color, skin color detector 17 for detecting the skin color, and eye color detector 18 for detecting the eye color based on the shape data and image data (color data) of the other source image, i.e., the female facial image G2 in this example.

Hair color detector 13, skin color detector 14, and eye color detector 15 first obtain the average of the color data of each pixel in the hair, skin, and eye areas obtained from the shape and image data of the male facial image G1. Based on the obtained average values, the colors representative of the hair color, skin color, and eye color are determined, and the hair color detection data, skin color detection data, and eye color detection data expressing the determined representative colors are then output.

Using eye color detector 15 by way of example, the area of the eyeballs is extracted from the shape data, the image data (color data) of each pixel within the extracted eye area is obtained, the average of the color data in the eye area is obtained, the color most representative of the eyes is then obtained based on the color data average, and the corresponding eye color detection data is output.

Figure 13:
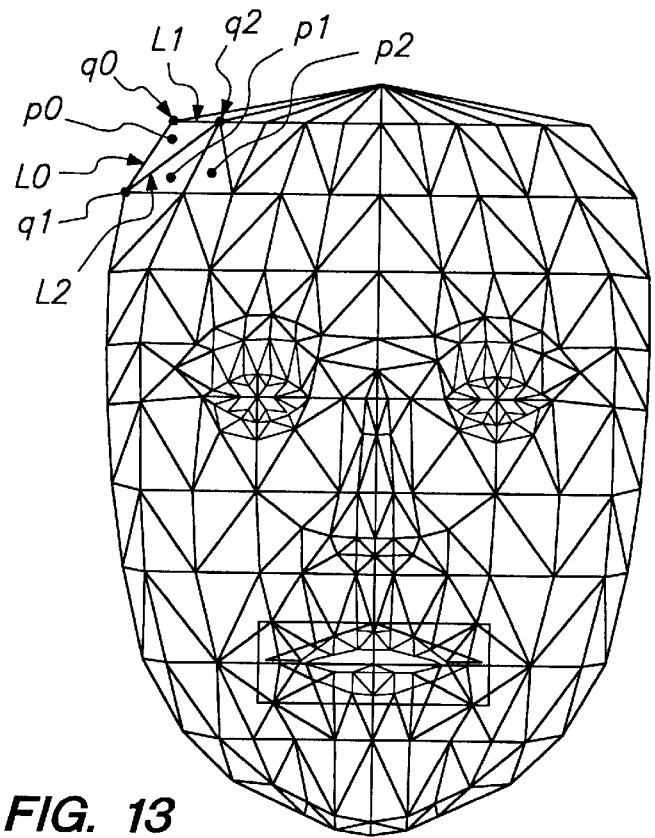
FIG. 13 is an example of a shape model of a particular facial image.

Hair color detector 13 and skin color detector 14 operate in the same manner to detect the representative colors and output the hair and skin color detection data, respectively. Note, however, that because the hair area is not shown in the shape model (see FIG. 13), the image data from a predetermined position around and above the face is extracted as the image data for the hair. Note, further, that this predetermined position around and above the face is set based on the size of the face shown in the shape model.

Hair color detector 16, skin color detector 17, and eye color detector 18 likewise obtain the average of the color data of each pixel in the hair, skin, and eye areas obtained from the shape and image data of the female facial image G2. Based on the obtained average values, the colors representative of the hair color, skin color, and eye color are determined, and the hair color detection data, skin color detection data, and eye color detection data expressing the determined representative colors are then output.

It is to be noted that the color detection in the respective image areas by the hair color detectors 13 and 16, skin color detectors 14 and 17, and eye color detectors 15 and 18 shall not be limited to methods obtaining the average of the color data of each pixel in each corresponding area as described above. Various other methods may be alternatively used, including obtaining the color distribution based on the color data of the pixels in each area, and determining the representative color based on the color distribution; or determining the frequency of each detected color in the pixel population of each area, and defining the most frequently occurring color as the representative color.

The color data respectively detected by each of the hair color detectors 13 and 16, skin color detectors 14 and 17, and eye color detectors 15 and 18 is thus output to genetic information table 19. The content of genetic information table 19 is shown by way of example in FIG. 7. More specifically, genetic information table 19 lists the various combinations of hair, skin, and eye color that may occur in children born from parents with various combinations of hair, skin, and eye color where the parents are represented as facial images G1 and G2. The groups of child facial images resulting from the various parent combinations are identified by group name (group Z1, Z2, . . . Zn) with the corresponding hair, skin, and eye colors stored in genetic information table 19.

For example, if the hair, skin, and eye colors of facial image G1 are black, yellow, and brown, respectively, and those of facial image G2 are black, white, and blue, the selected child facial image (background facial image G3) is group Z1, i.e., the group for which the hair, skin, and eye colors are black, white, and blue. If the hair, skin, and eye colors of facial image G1 are blonde, white, and blue, respectively, and those of facial image G2 are blonde, white, and brown, the selected child facial image (background facial image G3) is group Z2, i.e., the group for which the hair, skin, and eye colors are blonde, white, and blue. As thus described, the groups Z1, Z2, ... Zn of the facial images of children that may typically be born from parents of various hair, skin, and eye color combinations are predefined and stored in genetic information table 19.

One background (child) facial image G3 is then selected from among the stored groups Z1, Z2, ... Zn of child images based on the color detection data output from the hair color detectors 13 and 16, skin color detectors 14 and 17, and eye color detectors 15 and 18 for both facial images G1 and G2, and information identifying the selected group is output.

For example, if the hair, skin, and eye color detection data output from hair color detector 13, skin color detector 14, and eye color detector 15 for facial image G1 indicate blonde, white, and blue, and the hair, skin, and eye color detection data output from hair color detector 16, skin color detector 17, and eye color detector 18 for facial image G2 indicate blonde, white, and brown, this data is used to reference genetic information table 19 and thus select group Z2. A signal indicating that group Z2 was selected is then output from genetic information table 19.

Note that the group Z2 image represents that of a child with blonde hair, white skin, and blue eyes. As a result, the selected group represents the facial image of a child with hair, skin, and eye coloring genetically appropriate to the hair, skin, and eye colors of the father facial image G1 and the mother facial image G2.

It is to be noted that while a single background facial image G3 is selected from the selected child facial image group (group Z2 in the previous example), the means of making this selection is not here specifically defined because a variety of means are possible.

For example, selecting the sex and age of background facial image G3 may be determined by the user before inputting facial images G1 and G2, or by the user after the group is selected. Furthermore, if the user has already defined the child as being male, the user may select a facial image of a single male child from the male children in the selected group when selecting a single facial image of a child associated with the selected group. It is even possible to have the system generate a random number within a defined range to select the single facial image.

It is thus possible by means of the second embodiment described above to select background facial image G3 from a group of facial images with genetically appropriate hair, skin, and eye colors when synthesizing facial images G1 and G2 with background facial image G3 when facial images G1 and G2 represent subjects with racially distinct hair, skin, and eye coloring. It is therefore possible to prevent such unnatural results as generating a synthesized image with black hair from facial images G1 and G2 of subjects with blonde hair, for example.

Embodiment 3

The first and second embodiments above have been described as using two facial images G1 and G2 and a background facial image G3 to generate a synthesized image incorporating the features of the two facial images G1 and G2 into the background facial image G3. The third embodiment of the invention described below, however, is also capable of varying the expression of the synthesized facial image by changing coordinate values to slightly move a particular point in one or more feature areas, such as the eyes, noise, eyebrows, or mouth, in one source image G1 or G2, or the synthesized image interpolating these facial features into the background facial image G3. For example, the facial expression can be changed to a smile by moving a point in the lower eyelid slightly up.

The facial expression can thus be changed by moving certain points in the image. More specifically, the expression can be changed by defining data ("expression data" below) expressing what point(s) in the facial image are moved how much and in what direction to achieve a certain expression.

This third embodiment of the invention changes the facial expression using expression data normalized according to the two vectors directed horizontally and vertically from a given point in the facial image. While the facial image in which the expression is changed may be facial image G1, facial image G2, the synthesized image output by the first embodiment above, or any other image, the present embodiment is described as changing the expression of the synthesized facial image G4 obtained from the apparatus shown in FIG. 1 (the apparatus of the first embodiment) using the synthesized image data and shape data of facial image G4.

Figure 8:
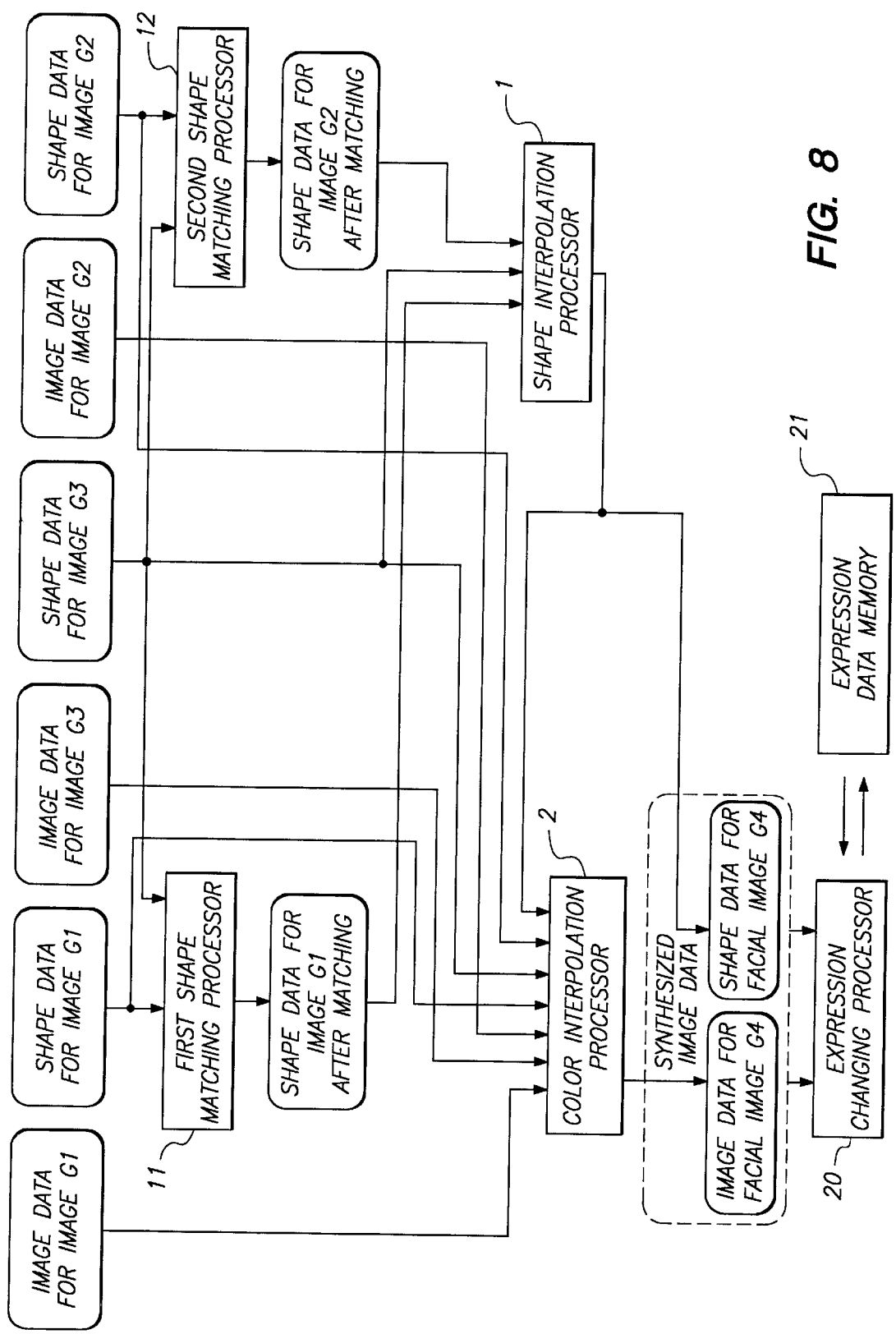
FIG. 8 is a block diagram illustrating the third embodiment of a facial image processing method and facial image processing apparatus according to the present invention.

FIG. 8 is a block diagram of the facial image processing apparatus according to this third embodiment of the invention. Note that this embodiment differs from the first embodiment in the addition of an expression changing processor 20 for executing the process changing the facial expression based on the shape data of the synthesized image G4 obtained from the facial image processing apparatus shown in FIG. 1, and an expression data memory 21 for storing the expression data. Note, further, that like parts are identified by like reference numbers in FIGS. 1 and 8, and further description thereof is omitted below.

The process executed by expression changing processor 20 is described next.

Figure 9:
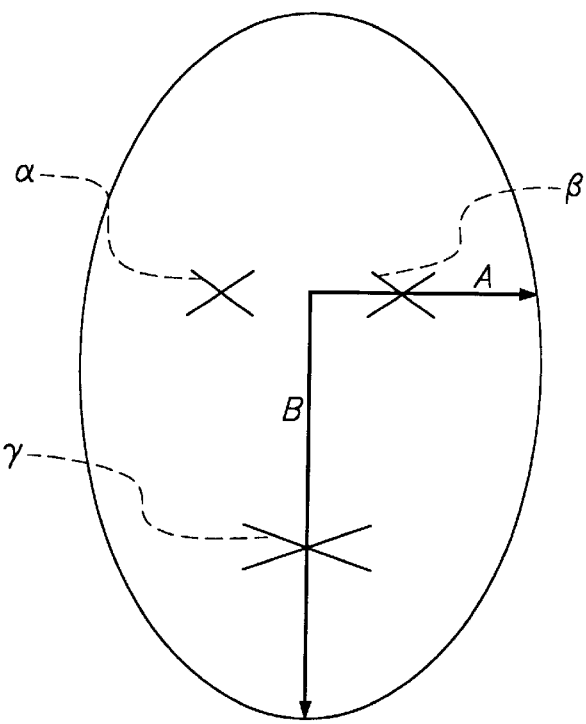
FIG. 9 illustrates the definitions of the normalization vectors in the second embodiment of the invention.

As shown in FIG. 9, expression changing processor 20 obtains vector A, vector B, and the vector that intersects vectors A and B and has a magnitude equal to the geometric mean of vectors A and B. Vector A is determined by the horizontal distance from the midpoint between the eyes α and β (between the eyebrows) to the facial contour; vector B is determined by the vertical distance from the midpoint between the eyes α and β down to the facial contour. After obtaining these vectors, the displacement vector V identifying the direction and amount of displacement required in a given point to obtain a certain expression can be calculated from the following equation $$V = v1 \cdot A + v2 \cdot B + v3 \sqrt{|A| \cdot |B|} \cdot \frac{(A \times B)}{|A \times B|} \quad \text{Equation 6}$$

where v1, v2, and v3 are preset constants used to change the expression, v1 being the constant determining the amount of movement in direction A, v2 being the constant determining the amount of movement in direction B, and v3 being the constant determining the amount of movement in the direction intersecting A and B; (A×B) is the exterior product of vectors A and B; and $$\frac{(A \times B)}{|A \times B|}$$

is a unit vector.

The displacement vector V is thus obtained based on three vectors where constants v1, v2, and v3 express the predetermined movement required to change the expression. What point must be moved how far in what direction must be determined to obtain, for example, a smiling expression. As described above, v1, v2, and v3 are the constants identifying the amount of movement required, v1 and v2 determining the displacement in directions A and B, respectively, and v3 determining the displacement in the direction intersecting A and B.

These constants are the predetermined expression data common to all facial images irrespective of the individual facial image, and are stored in expression data memory 21 organized by expression type. Vector A, vector B, and the vector intersecting these vectors will, however, vary according to the size of the facial image being processed. By thus using three vectors as described above, the amount of movement can be normalized based primarily on the horizontal width and vertical length of the face to account for individual differences in facial size.

The amount of movement in a particular point required to effect a particular change in expression can thus be obtained relative to the size of the facial image by obtaining the displacement vectors from equation (6) above. The desired expression can then be obtained by simply moving the relevant points the required distance.

It is to be noted that while the above embodiment has been described with respect to a three-dimensional shape model, it can also be applied to such two-dimensional models as frontal facial images. The displacement vector in equation (6) for this case can be expressed as $$V = v1 \cdot A + v2 B$$

where v1 is a constant determining the displacement in direction A, and v2 is a constant determining the displacement in direction B.

Embodiment 4

The fourth embodiment described below provides a method and apparatus for applying an aging process to a single facial image, which may be facial image G1, facial image G2, or a facial image G4 obtained by merging facial images G1 and G2 with a background facial image G3. This fourth embodiment is described below with reference to FIG. 10.

The method of this fourth embodiment can be applied to facial image G1, facial image G2, the synthesized facial image G4 obtained as described in the first and second embodiments above, or any other single facial image, but is described below as applying the aging process to the synthesized facial image G4 using the synthesized image data (image and shape data) obtained by the apparatus shown in FIG. 1.

Figure 10:
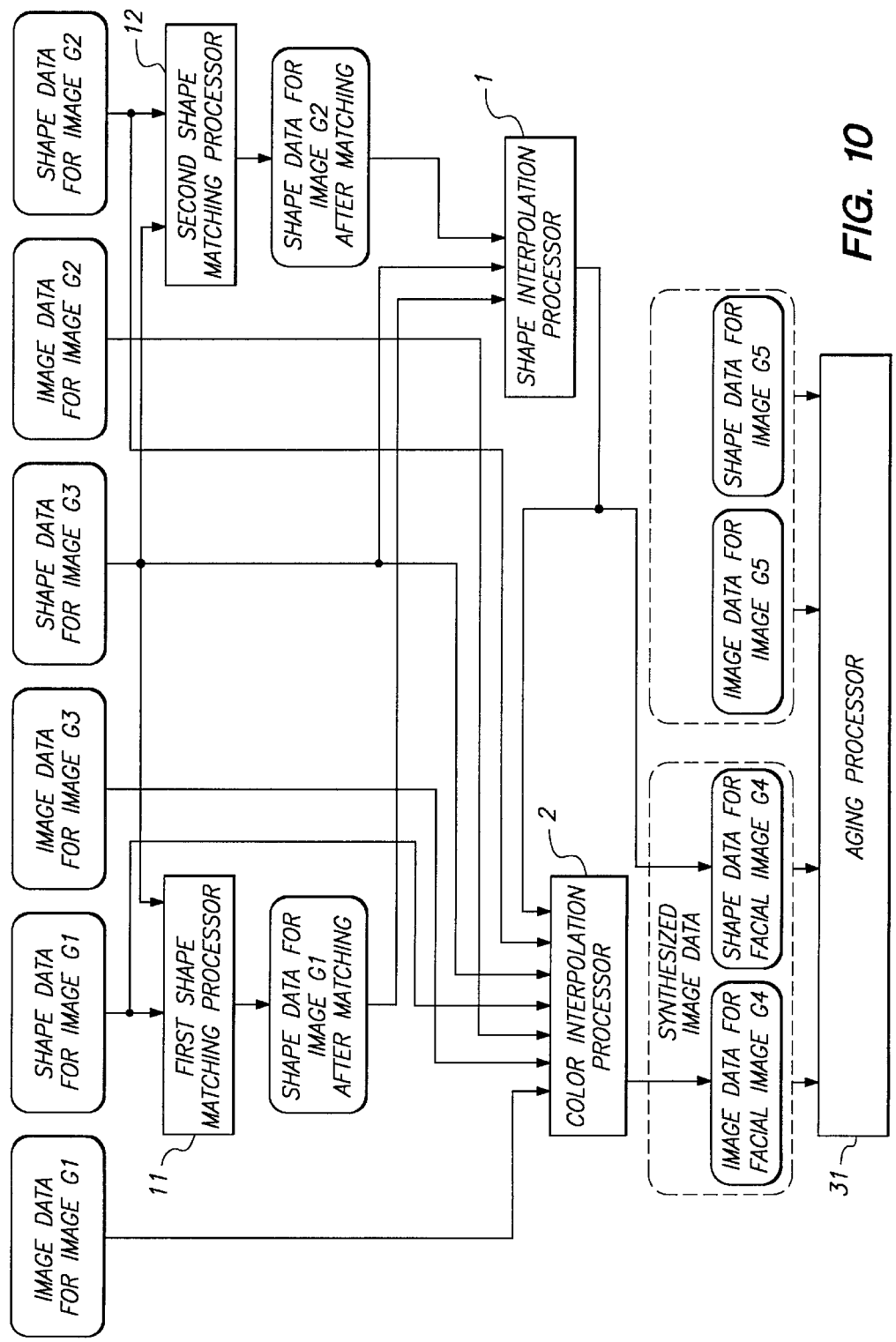
FIG. 10 is a block diagram illustrating the fourth embodiment of a facial image processing method and facial image processing apparatus according to the present invention.

FIG. 10 is a block diagram of a facial image processing apparatus according to this fourth embodiment. As shown in FIG. 10, this facial image processing apparatus further comprises aging processor 31 for executing the aging process based on the image data (image and shape data) of synthesized facial image G4 obtained by the apparatus shown in FIG. 1, and the image and shape data of a predefined facial image representing a particular chronological age. Note that like parts in FIG. 1 and FIG. 10 are identified by like references, and further description thereof is omitted below.

Figure 11:
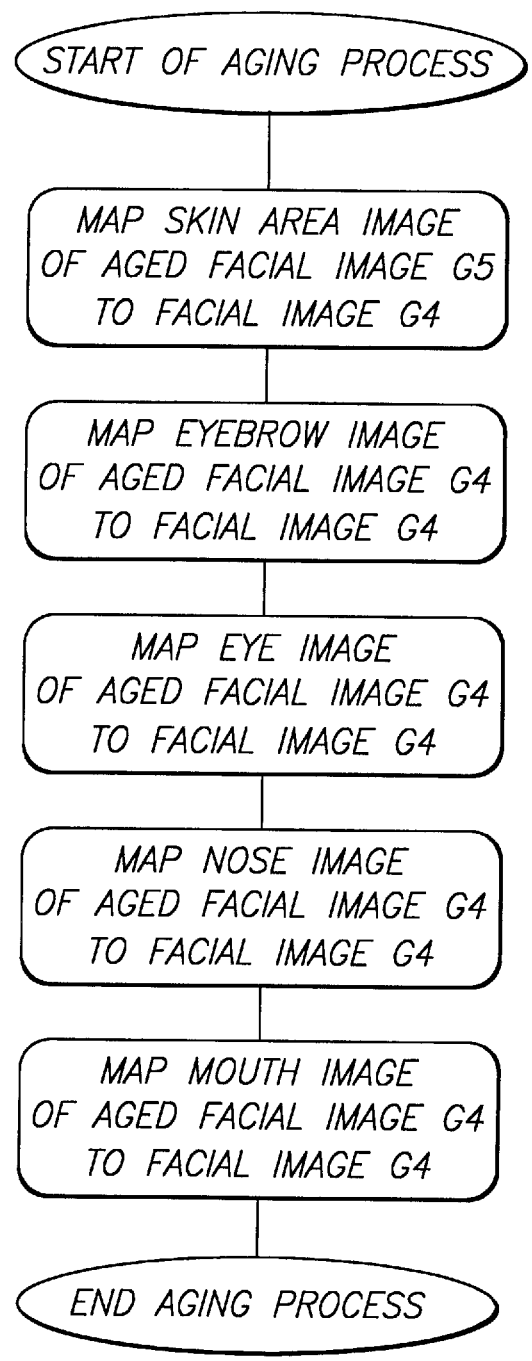
FIG. 11 is a flow chart illustrating the aging process executed according to the fourth embodiment of the present invention.

Aging processor 31 accomplishes the aging process by mapping the skin of an aged facial image G5 to that of the synthesized facial image G4 obtained by the means shown in FIG. 1. To accomplish this, the skin area of the face is extracted from the shape data of aged facial image G5, and the image data from this facial skin area is mapped to the same skin area of the synthesized facial image G4 to achieve a particular texturing. This aging process is briefly described below with reference to the flow chart thereof in FIG. 11.

The first step is to map the skin image data from aged facial image G5 to the skin area of facial image G4 (step s1). The eyebrow image data from facial image G4 is then mapped to the eyebrow area of facial image G4 (step s2); the eye image data from facial image G4 is then mapped to the eye area of facial image G4 (step s3); the nose image data from facial image G4 is then mapped to the nose area of facial image G4 (step s4); and the mouth image data from facial image G4 is then mapped to the mouth area of facial image G4 (step s5).

By thus replacing the skin area of the facial image to which the aging process is being applied with image data obtained from the skin area of an actual image of an old person having the desired facial skin texture, an image aging process achieving a more realistic expression can be achieved. In addition, by selecting the aged facial image according to the amount of aging to be reflected in the synthesized image, the degree of aging imparted to the processed image can be freely controlled. It should also be noted that this process shall not be limited to operations resulting in a facial image appearing older. Specifically, if the facial image G5 referenced for the aging process is an image of a person younger than shown in processed facial images G1 and G2, the resulting image can be processed to appear younger.

It should be further noted that in each of the embodiments described above the processing programs executing the various processes can be stored to floppy disk or other storage medium.

Effects of the invention

As described hereinabove, the present invention first converts the center points of specific feature units in the facial image, e.g., both eyes and the mouth, to the corresponding coordinates, and matches the converted coordinates to the corresponding image area in the background image. After thus grossly matching the overall image to the background image, shape interpolation and color interpolation are applied. It is thereby possible to prevent the eyes, mouth, and other facial features from shifting (moving) in the synthesized image even when the shape interpolation ratio is continuously changed during the image merging process.

It is also possible to create a synthesized image in which individual facial features are made to resemble either one of the source facial images G1 and G2 because shape interpolation is accomplished by changing the shape interpolation ratio by facial feature unit.

Color interpolation is also accomplished by setting the color interpolation ratio according to the magnitude of the luminance value in each part of the background facial image G3. More specifically, a more natural synthesized image can be achieved because areas of extremely high or low luminance caused by, for example, dark hair or highlights in the background image, can be left essentially unchanged in the synthesized image.

It is also possible to determine the color interpolation ratio according to the magnitude of the luminance value in each part of the source facial images G1 and G2. This prevents, for example, extremely low luminance areas, such as dark hair, in the source facial images G1 and G2 from appearing in the synthesized image, and results in a high quality synthesized image.

By changing the color interpolation ratio according to the facial feature unit being processed, it is possible to create a synthesized image in which the hue of specific facial features, such as the eyes or mouth, is caused to resemble one of the source facial images G1 or G2.

When synthesizing a new facial image from facial images G1 and G2 of people with different racial characteristics as expressed by the color of the hair, skin, and eyes using background facial image G3, it is also possible to select background facial image G3 from a group of images having hair, skin, and eye coloring genetically appropriate to the persons represented in facial images G1 and G2. It is therefore possible to prevent generating obviously unnatural facial images, including, for example, a facial image with black hair when both facial images G1 and G2 are depicted with blonde hair.

As also described above, the expression of the synthesized image can be changed by calculating the two vectors directed horizontally and vertically toward the contour of the facial image from a particular point in the facial image being processed, the vector intersecting these two vectors with a magnitude that is the geometric mean of these two vectors, and then calculating the displacement vector expressing the direction and amount of movement of the particular facial image point based on these calculated vectors and a preset constant for changing the expression. As a result, it is possible to change the facial expression using a simple process and calculation.

By replacing the skin area of the facial image to which the aging process is being applied with image data obtained from the skin area of an actual image of an old person having the desired facial skin texture as described above, an image aging process achieving a more realistic expression of aging can also be achieved.

I claim:

1. A facial image processing method for synthesizing a facial image from first and second source facial images and a background facial image, each of the three facial images comprising associated shape data and associated image data, the associated shape data representing an associated shape model and including a plurality of points with associated coordinates, the associated image data representing a color of each pixel in the associated shape model, the method comprising the steps of:

(a) grossly matching the first source facial image with the background facial image by converting coordinates of particular points in preselected feature areas in the shape model of the first source facial image to coordinates of corresponding points in the shape model of the background image so as to produce a first matched shape model;

(b) grossly matching the second source facial image with the background facial image by converting coordinates of particular points in preselected feature areas in the shape model of the second source facial image to coordinates of corresponding points in the shape model of the background facial image so as to produce a second matched shape model;

(c) interpolating the coordinates of the corresponding points in the matched shape models of the first and second source facial images and the shape model of the background facial image at a shape interpolation ratio so as to produce an interpolated shape model with associated shape interpolated data; and (d) interpolating a color of each pixel in the interpolated shape model at a color interpolation ratio, based on the shape data and the image data of the three images and the shape interpolated data so as to produce a synthesized image.

2. The image processing method of claim 1, wherein said step (c) comprises the step of changing the shape interpolation ratio according to a feature area being interpolated.

3. The image processing method according to claim 1, wherein the background facial image has luminance values associated with respective areas of said background facial image, and said step (d) comprises the step of setting the color interpolation ratio based on the luminance value of the corresponding area in the background facial image.

4. The image processing method of claim 3, further comprising the steps of:

setting a color interpolation ratio for areas of the background facial image with a median luminance value of a skin color in the background image to a lowest value relative to a color interpolation ratio of the first and second facial source images, setting a color interpolation ratio for areas of the background facial image with a luminance value that is out of a predetermined range of the median luminance value of the skin color in the background facial image to a highest value relative to the color interpolation ratio of the first and second source facial images, and setting a color interpolation ratio for areas of the background facial image with a luminance value that is within the predetermined range of the median luminance value in accordance with its luminance value.

5. The image processing method of claim 1, wherein the first and second source facial images have luminance values associated with respective areas of said first and second source facial images, and said step (d) comprises the step of setting the color interpolation ratio based on the luminance values of the corresponding area in the first and second source facial images.

6. The image processing method of claim 5, further comprising the steps of:

setting a color interpolation ratio for areas of the first and second source facial images with a median luminance value of a skin color in the first and second source facial images to a highest value relative to a color interpolation ratio of the background facial image, setting a color interpolation ratio for areas of the first and second source facial images with a luminance value that is out of a predetermined range of the median luminance value of the skin color in the first and second source facial images to a lowest value relative to the color interpolation ratio of the background image, and setting a color interpolation ratio for areas of the first and second source facial images with a luminance value within the predetermined range of the median luminance value in accordance with its luminance value.

7. The image processing method of claim 1, wherein said step (d) comprises the step of varying the color interpolation ratio according to a facial feature area being interpolated.

8. The image processing method of claim 1, further comprising the step of changing a facial expression of the synthesized image by moving a particular point in the synthesized image a predetermined distance, said step of changing a facial expression comprising the steps of:

obtaining first, second and third vectors, the first vector being directed from a predetermined point in the synthesized image toward a contour of the synthesized image in a first direction, the second vector being directed from the predetermined point in the synthesized image toward the contour of the synthesized image in a second direction, and the third vector being orthogonal to the first and second vectors and having a magnitude that is a geometric mean of the first and second vectors; and calculating, based on preset constants and the first, second and third vectors, a displacement vector expressing a direction and amount of movement of the particular point in the synthesized image to be moved for changing the facial expression.

9. The image processing method of claim 1, further comprising the step of changing a facial expression of a preselected one of the first and second source images by moving a particular point in the preselected image a predetermined distance, said step of changing a facial expression comprising the steps of:

obtaining first, second and third vectors, the first vector being directed from a predetermined point in the preselected image toward a contour of the preselected image in a first direction, the second vector being directed from the predetermined point in the preselected image toward the contour of the preselected image in a second direction, and the third vector being orthogonal to the first and second vectors and having a magnitude that is a geometric mean of the first and second vectors; and calculating, based on preset constants and the first, second and third vectors, a displacement vector expressing a direction and amount of movement of the particular point in the synthesized image to be moved for changing the facial expression.

10. A image processing apparatus for synthesizing a facial image from first and second source facial images and a background facial image, each of the three facial images comprising associated shape data and associated image data, the associated shape data representing an associated shape model and including a plurality of points with associated coordinates, the associated image data representing a color of each pixel in the associated shape model, the apparatus comprising:

a first shape matching processor for grossly matching the first source facial image with the background facial image by converting coordinates of particular points in preselected feature areas in the shape model of the first source facial image to coordinates of corresponding points in the shape model of the background facial image so as to produce a first matched shape model;

a second shape matching processor for grossly matching the second source facial image with the background facial image by converting coordinates of particular points in preselected feature areas in the shape model of the second source facial image to coordinates of corresponding points in the shape model of the background facial image so as to produce a second matched shape model;

a shape interpolation processor which is coupled to said first and second shape matching processors for interpolating the coordinates of the corresponding points in the matched shape models of the first and second source facial images and the shape model of the background facial image at a shape interpolation ratio so as to produce an interpolated shape model with associated shape interpolated data; and a color interpolation processor which is coupled to said shape interpolation processor for interpolating a color of each pixel in the interpolated shape model at a color interpolation ratio, based on the shape data and the image data of the three facial images and the shape interpolated data so as to produce a synthesized image.

11. The image processing apparatus of claim 10, wherein said shape interpolation processor comprises means for changing the shape interpolation ratio according to a feature area being interpolated.

12. The image processing apparatus of claim 10, wherein the background facial image has luminance values associated with respective areas of said background facial image, and said color interpolation processor comprises means for setting the color interpolation ratio based on the luminance values.

13. The image processing apparatus of claim 12, wherein the means for setting the color interpolation ratio sets a color interpolation ratio for areas of the background facial image with a median luminance value of a skin color in the background facial image to a lowest value relative to a color interpolation ratio of the first and second source facial images, sets a color interpolation ratio for areas of the background facial image with a luminance value that is out of a predetermined range of the median luminance value of the skin color in the background facial image to a highest value relative to the color interpolation ratio of the first and second source facial images, and sets a color interpolation ratio for areas of the background facial image with a luminance value that is within the predetermined range of the median luminance value in accordance with its luminance value.

14. The image processing apparatus of claim 10, wherein said color interpolation processor comprises:

means for determining a luminance value of each area of the first and second source facial images, and means for setting the color interpolation ratio of a particular area of the first and second source facial images according to its luminance value.

15. The image processing apparatus of claim 14, wherein the means for setting the color interpolation ratio sets a color interpolation ratio for areas of the first and second source facial images with a median luminance value of a skin color in the first and second source facial images to a highest value relative to a color interpolation ratio of the background facial image, sets a color interpolation ratio for areas of the first and second source facial images with a luminance value that is out of a predetermined range of the median luminance value of the skin color in the first and second source facial images to a lowest value relative to the color interpolation ratio of the background facial image, and sets a color interpolation ratio for areas of the first and second source facial images with a luminance value within the predetermined range of the median luminance value in accordance with its luminance value.

16. The image processing apparatus of claim 10, wherein said color interpolation processor comprises means for varying the color interpolation ratio according to a feature area being interpolated.

17. The image processing apparatus of claim 10, further comprising an expression-changing processor for changing a facial expression of the synthesized image by moving a particular point in the synthesized image a predetermined distance, said expression-changing processor comprising:

means for obtaining first, second and third vectors, the first vector being directed from a predetermined point in the synthesized image toward a contour of the synthesized image in a first direction, the second vector being directed from the predetermined point in the synthesized image toward the contour of the synthesized image in a second direction, and the third vector being orthogonal to the first and second vectors and having a magnitude that is a geometric mean of the first and second vectors; and means, based on preset constants and the first, second and third vectors, for calculating a displacement vector expressing a direction and amount of movement of the particular point in the synthesized image to be moved for changing the facial expression.

18. The image processing apparatus of claim 10, further comprising an expression-changing processor for changing a facial expression of a preselected one of the first and second source facial images by moving a particular point in the preselected image a predetermined distance, said expression-changing processor comprising:

means for obtaining first, second and third vectors, the first vector being directed from a predetermined point in the preselected image toward a contour of the preselected image in a first direction, the second vector being directed from the predetermined point in the preselected image toward the contour of the preselected image in a second direction, and the third vector being orthogonal to the first and second vectors and having a magnitude that is a geometric mean of the first and second vectors; and means, based on preset constants and the first, second and third vectors, for calculating a displacement vector expressing a direction and amount of movement of the particular point in the synthesized image to be moved for changing the facial expression.

* * * * *